(12) United States Patent
Wu (10) Patent No.: US 10,673,266 B2
(45) Date of Patent: *Jun. 2, 2020

(54) ELECTRIC VEHICLE SUPPLY EQUIPMENT AND CHARGING METHOD

(71) Applicant: DELTA ELECTRONICS, INC., Taoyuan (TW)

(72) Inventor: Tsung-Yuan Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,705

(22) Filed: Feb. 1, 2019

(65) Prior Publication Data
US 2019/0165582 A1 May 30, 2019

Related U.S. Application Data

(63) Continuation of application No. 15/479,296, filed on Apr. 5, 2017, now Pat. No. 10,236,705.

(30) Foreign Application Priority Data

Nov. 16, 2016 (TW) .................................. 105137403

(51) Int. Cl.
*H02J 7/00* (2006.01)
*B60L 53/30* (2019.01)
(Continued)

(52) U.S. Cl.
CPC .............. *H02J 7/007* (2013.01); *B60L 53/30* (2019.02); *B60L 53/31* (2019.02); *B60L 53/60* (2019.02);
(Continued)

(58) Field of Classification Search
CPC ... Y02T 90/14; Y02T 10/7005; Y02T 90/128; Y02T 10/7088; Y02T 90/163
See application file for complete search history.

(56) References Cited

U.S. PATENT DOCUMENTS

2003/0097837 A1* 5/2003 Hiraki ................... E02F 9/2217
60/486
2004/0095103 A1* 5/2004 Kernahan ............... G05F 3/262
323/272
(Continued)

FOREIGN PATENT DOCUMENTS

CN 101909928 A 12/2010
CN 104052050 A 9/2014
(Continued)

OTHER PUBLICATIONS

The pertinent parts of US20160207412A1.
The pertinent parts of EP2804269A1.

*Primary Examiner* — Arun C Williams
(74) *Attorney, Agent, or Firm* — CKC & Partners Co., LLC (57) ABSTRACT

An electric vehicle supply equipment includes multiple first power modules and a control circuit. The first power modules are electrically coupled in series at output and configured to provide a charging current and a charging voltage to charge an electric vehicle. The control circuit is configured to control one of the first power modules to be operated in a constant current mode to output the charging current, and configured to control the rest of first power modules to be operated in a constant voltage mode respectively to have at least one output voltage for generation of the charging voltage.

15 Claims, 6 Drawing Sheets

(51) Int. Cl.
B60L 53/31 (2019.01)
B60L 53/60 (2019.01)

(52) U.S. Cl.
CPC ........ *Y02T 10/7005* (2013.01); *Y02T 10/7088* (2013.01); *Y02T 90/121* (2013.01); *Y02T 90/128* (2013.01); *Y02T 90/14* (2013.01)

(56) References Cited

U.S. PATENT DOCUMENTS

| | | |
|---|---|---|
| 2004/0178766 A1 | 9/2004 | Bucur et al. |
| 2007/0284159 A1 | 12/2007 | Takami et al. |
| 2008/0219337 A1 | 9/2008 | Kawata et al. |
| 2014/0062396 A1 | 3/2014 | Reddy |
| 2015/0011123 A1 | 1/2015 | Takata et al. |
| 2015/0015203 A1 | 1/2015 | Takata et al. |
| 2016/0207412 A1 | 7/2016 | Krammer et al. |

FOREIGN PATENT DOCUMENTS

| | | |
|---|---|---|
| EP | 2804269 A1 | 11/2014 |
| TW | 201505874 A | 2/2015 |

* cited by examiner

ELECTRIC VEHICLE SUPPLY EQUIPMENT AND CHARGING METHOD

RELATED APPLICATIONS

This application is a continuation of U.S. application Ser. No. 15/479,296, filed Apr. 5, 2017, which claims priority to Taiwan Application Serial Number 105137403, filed Nov. 16, 2016, all of which are herein incorporated by reference.

BACKGROUND

Technical Field

The present disclosure relates to electric vehicle supply equipment, and in particular, to electric vehicle supply equipment with power output adjusting ability.

Description of Related Art

In recent times, as environmental awareness rises, developing electric vehicles powered by electricity to replace traditional automobiles powered by fossil-based fuels has gradually becoming an important target of automobile industry.

However, in order to reduce charging time, an electric vehicle supply equipment (EVSE) nowadays requires high power to charge the electric vehicles (EV). In addition, for electric vehicle having different battery systems, the charging voltage and charging current required are different. With the increasing battery capacity of the electric vehicles, the charging voltage required by the electric vehicles when charging also increases.

Therefore, how to design the EVSE to meet the charging requirement of various EVs is an important research topic in the field.

SUMMARY

One aspect of the present disclosure is an electric vehicle supply equipment. The electric vehicle supply equipment includes a plurality of first power modules and a control circuit. The first power modules are electrically coupled to each other in series at output, and configured to provide a charging current and a charging voltage to charge an electric vehicle. The control circuit is configured to output a first current control signal to control one of the first power modules to be operated in a constant current mode, and output a plurality of first voltage control signals to control the other first power modules to be operated in a constant voltage mode respectively. The control circuit controls the charging current via the first power module operated in the constant current mode, and controls the first power modules operated in the constant voltage mode have output voltages corresponding to their first voltage control signals respectively.

Another aspect of the present disclosure is an electric vehicle supply equipment. The electric vehicle supply equipment includes a first charging circuit and a control circuit. The first charging circuit includes a first constant current output power module and at least one first constant voltage output power module. The control circuit is configured to output a first current control signal to the first constant current output power module, to control a first output current of the first charging circuit, and output at least one first voltage control signal to the corresponding at least one first constant voltage output module, to control a first output voltage of the at least one first constant voltage output power module such that the first charging circuit supply power to an electric vehicle. The control circuit outputs the corresponding first current control signal and the first voltage control signal according to a control pilot signal output by the electric vehicle.

Yet another aspect of the present disclosure is a charging method. The charging method includes: receiving, by a control circuit, a control pilot signal from an electric vehicle; determining, by the control circuit, a charging current and a charging voltage according to the control pilot signal; outputting, by the control circuit, a first current control signal to one of a plurality of first power modules to control the first power module to be operated in a constant current mode; controlling the charging current by the first power module operated in the constant current mode; and outputting, by the control circuit, a plurality of first voltage control signals to other first power modules to control the first power modules to be operated in a constant voltage mode respectively, wherein the first power modules operated in the constant voltage mode have the output voltages corresponding to their first voltage control signals respectively.

BRIEF DESCRIPTION OF THE DRAWINGS

The disclosure can be more fully understood by reading the following detailed description of the embodiments, with reference made to the accompanying drawings as follows.

DETAILED DESCRIPTION

The embodiments herein described are by examples, and are not intended to be limiting. Alternatives, modifications and equivalents may be included within the spirit and scope of the disclosure as defined by the appended claims. Drawings are not drawn to scale and not meant to limit the actual embodiments of the present disclosure. Wherever possible, same reference numbers are used in the drawings and the description to refer to the same or like parts for better understanding. While method steps are disclosed herein as a series of acts or events, some may occur in different orders and/or concurrently with other acts or events apart from those described herein. The term "coupled" and "connected" may be used to indicate that two or more elements cooperate or interact with each other, and may also be termed electrically coupled/connected. The terms "first," "second," etc., are used to distinguish one element from another.

Figure 1:
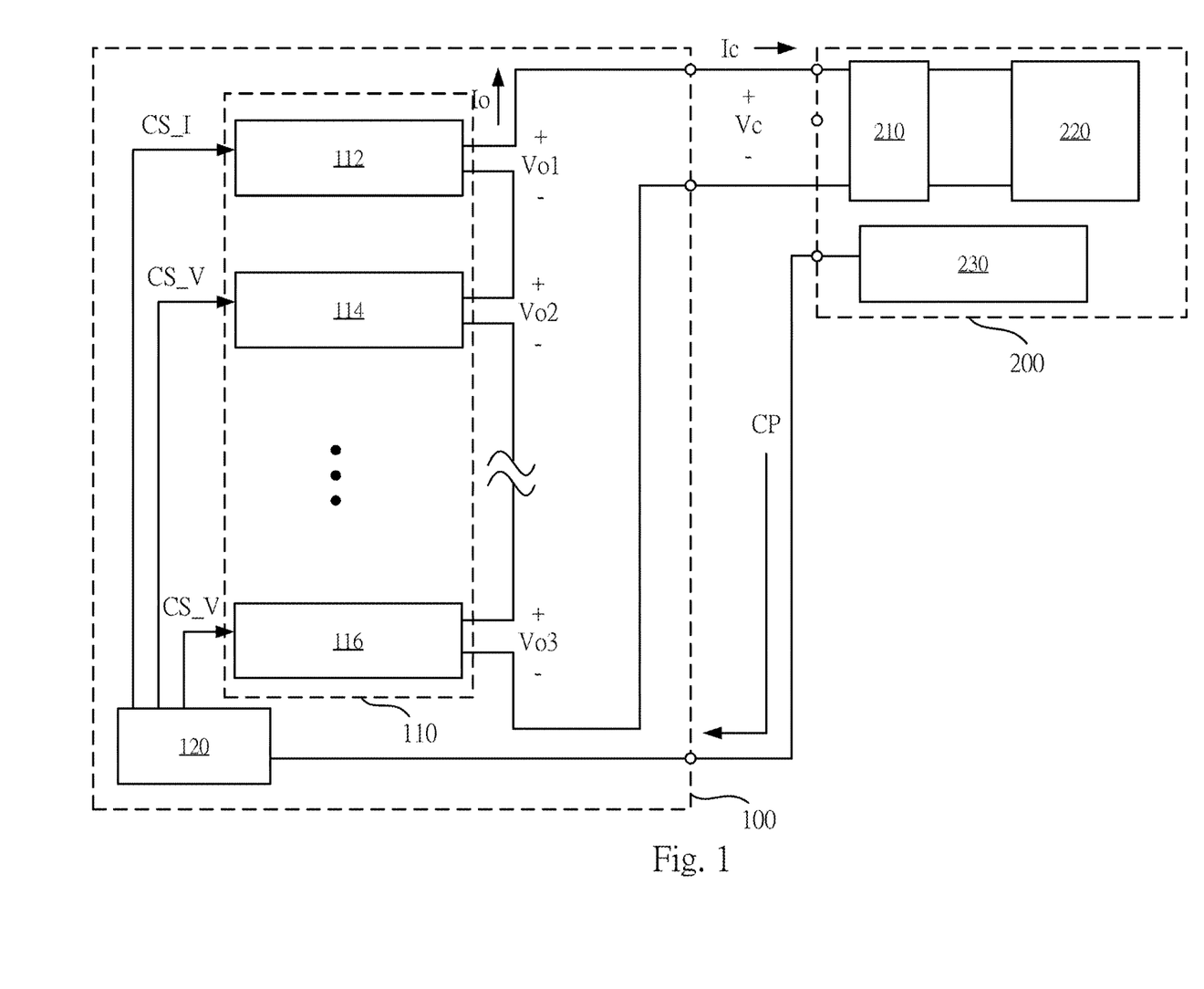
FIG. 1 is a diagram illustrating the operation of the electric vehicle supply equipment (EVSE) according to some embodiments of the present disclosure.

Reference is made to FIG. 1. FIG. 1 is a diagram illustrating the operation of the electric vehicle supply equipment (EVSE) 100 according to some embodiments of the present disclosure. As shown in FIG. 1, in some embodiments, the electric vehicle supply equipment 100 may be configured to charge the electric vehicle (EV) 200. Specifically, the electric vehicle supply equipment 100 may output the charging voltage Vc and the charging current Ic to the electric vehicle 200 via the connection terminals.

In some embodiments, the electric vehicle 200 includes a protection circuit 210, a battery module 220 and a battery management circuit 230. The charging voltage Vc and the charging current Ic may be transmitted via the protection circuit 210 to the battery module 220, so as to charge the battery module 220. When the charging voltage Vc or the charging current Ic output by the electric vehicle supply equipment 100 exceeds the rated upper limit of which the battery module 220 may handle, the protection circuit 210 may cut off the electric path between the electric vehicle supply equipment 100 and the electric vehicle 200 in order to protect the electric vehicle 200. For example, the protection circuit 210 may include various types of protection units such as an over-voltage protection unit, an over-current protection unit, etc. The battery management circuit 230 is configured to output a control pilot signal CP to the electric vehicle supply equipment 100. Thus, the electric vehicle 200 may communicate with the electric vehicle supply equipment 100 through the control pilot signal CP, such that the electric vehicle supply equipment 100 provides the charging voltage Vc and the charging current Ic required by the electric vehicle 200. Alternatively stated, for different types of electric vehicle 200, the electric vehicle supply equipment 100 may accordingly adjust the amplitude of the charging voltage Vc and the charging current Ic to satisfy the charging requirement of the electric vehicle 200.

As shown in FIG. 1, in some embodiments, the electric vehicle supply equipment 100 includes a charging circuit 110 and a control circuit 120. The charging circuit 110 is configured to provide the charging current Ic and the charging voltage Vc to charge the electric vehicle 200. Specifically, the charging circuit 110 includes multiple power modules 112, 114, 116 electrically coupled to each other in series at output. Since the power modules 112, 114, 116 are coupled in series at the output, the charging voltage Vc output by the charging circuit 110 may be higher than the rated maximum output voltage of the power modules 112, 114, 116 respectively, in which the rated maximum output voltage indicates the largest voltage may be output by each of the power modules. Alternatively stated, the charging circuit 110 may provide the charging voltage Vc with higher voltage level by coupling multiple power modules 112, 114, 116 in series at the output, in order to meet the charging requirements of different electric vehicles 200.

The control circuit 120 is electrically coupled to each of the power modules 112, 114, 116 in the charging circuit 110, and respectively output the corresponding current control signal CS_I and the corresponding voltage control signal CS_V to control each of the power modules 112, 114, 116. Specifically, the control circuit 120 may transmit the current control signal CS_I and the voltage control signal CS_V to each of the power modules 112, 114, 116 by wire or wireless communication methods. In some embodiments, the control circuit 120 outputs the current control signal CS_I to the power module 112 to control the power module 112 to be operated in the constant current mode. In addition, the control circuit 120 outputs the voltage control signal CS_V to the other power modules 114, 116 to control the power modules 114 and 116 to be operated in the constant voltage mode.

Alternatively stated, in some embodiments, only one of the power modules 112, 114, 116 (e.g., the power module 112) in the charging circuit 110 is operated in the constant current mode as the constant current output power module. Other power modules (e.g., the power modules 114, 116) are all operated in the constant voltage mode as the constant voltage output power module.

As shown in FIG. 1, the control circuit 120 determine the charging current Ic output from the electric vehicle supply equipment 100 to the electric vehicle 200 according to the control pilot signal CP output by the electric vehicle 200, so as to output the corresponding current control signal CS_I to the power module 112 operated in the constant current mode. Thus, the control circuit 120 may control the charging current Ic via the power module 112 operated in the constant current mode. Specifically, the power module 112 determines the output current Io of the power module 112 according to the current control signal CS_I. Since the power modules 112, 114, 116 of the charging circuit 110 are coupled in series at the output, the value of the output current Io of the power module 112 is the value of the charging current Ic of which the charging circuit 110 outputs to the electric vehicle 200. Alternatively stated, the value of the charging current Ic output by the charging circuit 110 is determined by the current command received by the constant current output power module.

Similarly, the control circuit 120 outputs the corresponding voltage control signal CS_V to the power modules 114, 116 operated in the constant voltage mode according to the control pilot signal CP output by the battery management circuit 230 in the electric vehicle 200, in order to control the power modules 114, 116 have output voltages Vo2, Vo3 corresponding to their voltage control signals CS_V respectively.

In some embodiments, the control circuit 120 may control the power modules 114, 116 operated in the constant voltage mode have the same output voltages Vo2, Vo3. Since the current flowing through each power modules is the same, the power modules 114, 116 have the same power output.

For example, in some embodiments, the value of the output voltages Vo2, Vo3 may be determined based on the charging voltage Vc required by the battery module 220 in the electric vehicle 200 and the amounts of the power modules 112, 114, 116 in the charging circuits 110. For example, when the charging voltage Vc required by the battery module 220 is about 1500 Vdc, and there are total three power modules 112, 114, 116 in the charging circuit 110, each of the power module may share about 500 Vdc. Thus, the control circuit 120 may control the output voltages Vo2 and Vo3 of the power modules 114, 116 operated in the constant voltage mode to be 500 Vdc respectively.

Accordingly, the 1500 Vdc charging voltage Vc may be divided equally to the power modules 114, 116 operated in the constant voltage mode and the power module 112 operated in the constant current mode. It is noted that although the charging circuit 120 does not control the output voltage Vo1 of the power module 112 operated in the constant current mode, the charging voltage Vc is controlled by the battery module 220 at about 1500 Vdc, so the output voltage Vo1 between two terminals of the power module 112 is the charging voltage Vc subtracted by the output voltages Vo2 and Vo3 of the power modules 114, 116 operated in the constant voltage mode.

In addition, in some embodiments, the control circuit 120 may also control the power modules 114, 116 operated in the constant voltage mode have different output voltages Vo2, Vo3. For example, the control circuit 120 may output corresponding voltage control signals CS_V respectively to the power modules 114, 116, such that the output voltage of the power module 114 is 490V and the output voltage of the power module 114 is 510V, but the present disclosure is not limited thereto. Alternatively stated, the power modules 114 and 116 may apply different specs, or be realized by power modules having different rating output voltages respectively, and be controlled at different output voltages Vo2, Vo3.

Specifically, the voltage command value of the voltage control signal CS_V may be configured as the required target value (e.g., 500 Vdc) such that the output voltages Vo2, Vo3 of the constant voltage output power modules (i.e., the power modules 114, 116) remain constant. The current command value of the voltage control signal CS_V may be configured to be the rated maximum output current of the power modules 114, 116. When the actual output voltage Vo2, Vo3 of the constant voltage output power modules (i.e., the power modules 114, 116) meet the voltage command value, the actual output current Io of the constant voltage output power modules (i.e., the power modules 114, 116) is determined by the constant current output power module (i.e., power module 112). Alternatively stated, in some embodiments, after the actual output voltage Vo2, Vo3 of the constant voltage output power modules (i.e., the power modules 114, 116) meet the voltage command value, the output current Io will not meet the configured current command value.

On the other hand, the current command value of the current control signal CS_I may be configured as the required target value such that the output current Io of the constant current output power module (i.e., the power module 112) remain constant. The voltage command value of the current control signal CS_I may be configured to be larger than the voltage command value of the voltage control signal CS_V, such as 600 Vdc. When the actual output current Io of the constant current output power module (i.e., the power module 112) meet the current command value, the actual output voltage Vo1 of the constant current output power module (i.e., the power module 112) is determined by the output voltage Vo2, Vo3 of the constant voltage output power modules (i.e., power modules 114, 116), and the charging voltage Vc. Alternatively stated, in some embodiments, after the actual output current Io of the constant current output power module (i.e., the power module 112) meets the current command value, the output voltage Vo1 will not meet the configured current voltage value.

For example, when the charging voltage Vc of the battery module 220 is about 1200 Vdc, the output voltage Vo2, Vo3 of the power modules 114, 116 in the constant voltage mode respectively may be both controlled at 400 Vdc, or may be accordingly controlled at 390 Vdc and 410 Vdc differently. At the time, the output voltage Vo1 of the power module 112 in the constant current mode is about 400 Vdc. When the charging voltage Vdc gradually increases to about 1250 Vdc with the charging process, the output voltage Vo2, Vo3 of the power modules 114, 116 in the constant voltage mode may remain unchanged, and the output voltage Vo1 of the power module 112 in the constant current mode may gradually increase to 450 Vdc.

In addition, in some other embodiments, the control circuit 120 may also perform a dynamic adjustment and respectively adjust the voltage control signal CS_V output to the power modules 114, 116, such that the output voltage Vo2, Vo3 of the power modules 114, 116 in the constant voltage mode is adjusted to 420 Vdc respectively. Accordingly, the output voltage Vo1 of the power module 112 in the constant current mode may be about 410 Vdc. Thus, the control circuit 120 may equally distribute the power of each of the power modules 112, 114, and 116.

Therefore, by controlling the power modules 112, 114, 116 in the charging circuit 110 to be operated in the constant current mode and the constant voltage mode respectively, the electric vehicle supply equipment 100 may provide a higher charging voltage Vc to charge the electric vehicle 200 through power modules 112, 114, 116, with lower rated maximum output voltage, coupled in series at the output.

Furthermore, though three power modules 112, 114, 116 are depicted in FIG. 1, the amount is merely by example for the convenience of explanation and not meant to limit the present disclosure. One skilled in the art may arrange proper amount, or the rated maximum output voltage, the rated maximum output current, the rated output power of each power modules based on actual needs in order to satisfy the requirement of the output power for various electric vehicle supply equipment 100.

Figure 2:
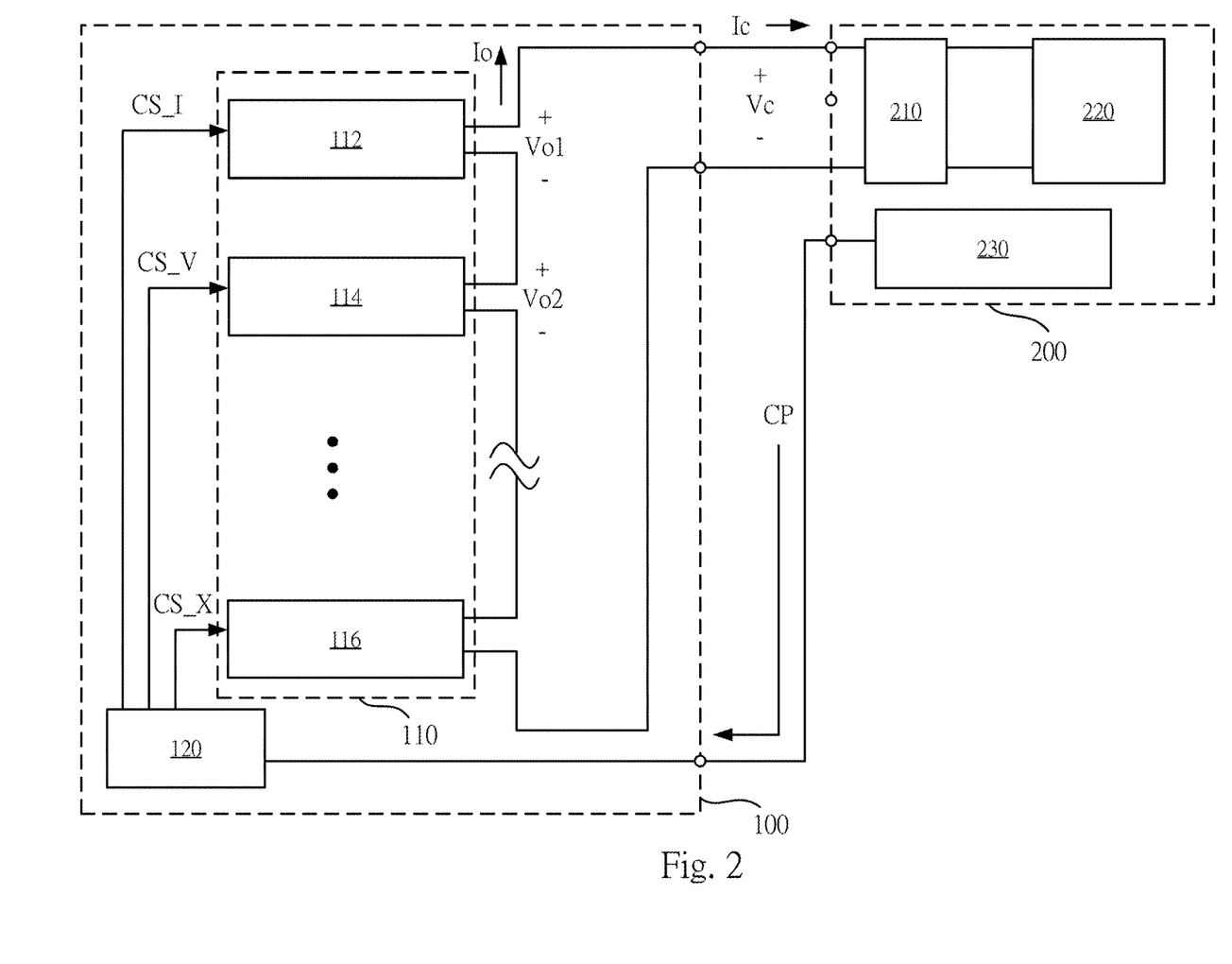
FIG. 2 is a diagram illustrating the operation of the electric vehicle supply equipment (EVSE) according to some embodiments of the present disclosure.

Reference is made to FIG. 2. FIG. 2 is a diagram illustrating the operation of the electric vehicle supply equipment (EVSE) 100 according to some embodiments of the present disclosure. As shown in FIG. 2, in some embodiments, if the charging voltage Vc required by the electric vehicle 200 is low, the electric vehicle supply equipment 100 may selectively turn off one or more power modules (e.g., the power module 116) in the charging circuit 110 by outputting corresponding control signal CS_X by the control circuit 120. Accordingly, the charging circuit 110 may supply the charging voltage Vc and the charging current Ic with less power modules (e.g., the power modules 112, 114), and thus the loss in the charging circuit 110 may be reduced. Thus, the power conversion efficiency of the electric vehicle supply equipment 100 may be increased, and unnecessary power loss is avoided.

For example, when the charging voltage Vc required by the battery module is about 1000 Vdc, and the rated maximum output voltage of the power modules 112, 114, 116 in the charging circuit 110 is larger than 500 Vdc (e.g., 600 Vdc), the control circuit 120 may output corresponding control signal CS_X to turn off the power module 116, and respectively output the current control signal CS_I, and the voltage control signal CS_V to control the power modules 112, 114 to be operated in the constant current mode and the constant voltage mode respectively, in which the power module 112 in the constant current mode determines the output current Io, and the output voltage Vo2 of the power module 114 in the constant voltage mode is about 500 Vdc.

Accordingly, the 1000 Vdc charging voltage Vc may be equally divided to the power module 114 in the constant voltage mode and the power module 112 in the constant current mode.

Similar to the embodiment shown in FIG. 1, though only three power modules 112, 114, 116 coupled in series at the output are depicted in FIG. 2, the amount is merely by example for the convenience of explanation and not meant to limit the present disclosure. In some embodiments, the charging circuit 110 may include over three power modules 112, 114, 116 coupled in series at the output. The control circuit 120 may also output corresponding control signal CS_X selectively to turn off multiple power modules when there are more than three power modules 112, 114, 116 coupled in series at the output in the charging circuit 110.

Figure 3:
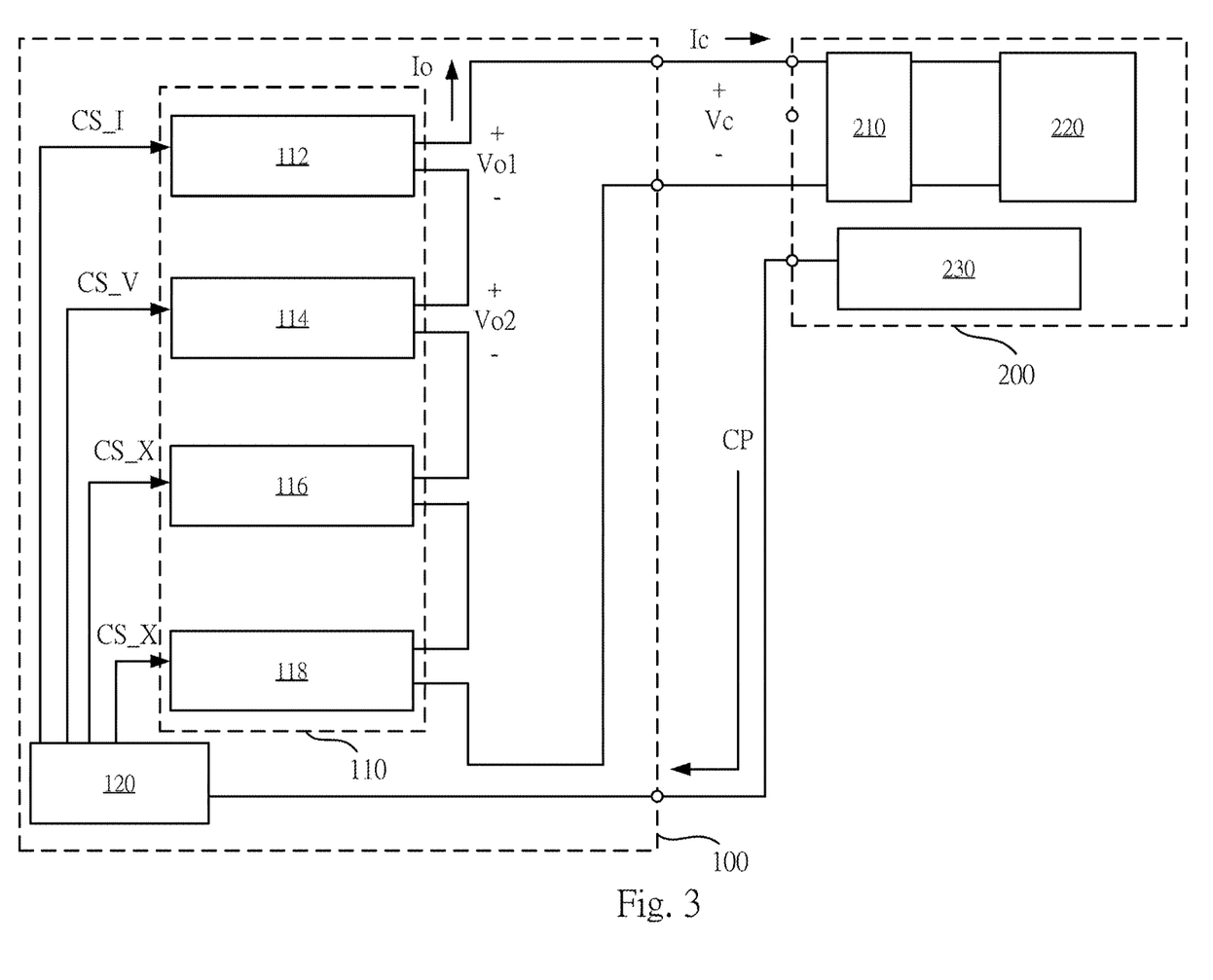
FIG. 3 is a diagram illustrating the operation of the electric vehicle supply equipment (EVSE) according to some embodiments of the present disclosure.

Reference is made to FIG. 3. FIG. 3 is a diagram illustrating the operation of the electric vehicle supply equipment (EVSE) 100 according to some embodiments of the present disclosure. As depicted in FIG. 3, in some embodiments, the charging circuit 110 includes power modules 112, 114, 116, 118 coupled to each other in series at the output. The control circuit 120 output the corresponding control signal CS_X to the power modules 116, 118 to turn off the power modules 116, 118 and provide the charging voltage Vc and the charging current Ic by the power modules 112, 114.

Alternatively stated, if the charging circuit 110 includes N power modules, while the charging voltage Vc required by the electric vehicle 200 is smaller than (N−P) multiplied by the rated maximum output voltage of each power modules, the control circuit 120 may output corresponding control signal CS_X to turn off P power modules in the charging circuit 110, in which N is an integer larger than or equal to 2, and P is an integer smaller than N.

Accordingly, the control circuit 120 may control (N−P) power modules to be on, and P power modules to be off. Since the charging voltage Vc is smaller than (N−P) multiplied by the rated maximum output voltage of each power modules, the charging voltage Vc may be supplied by turning on only (N−P) power modules. In addition, the control circuit 120 may also selectively determine the number of the power modules to be on or off based on actual needs under the circumstance that each power module are ensured to be operated within the rated maximum output voltage, so as to balance between increasing power conversion efficiency and ensuring the safety of the circuit and the device.

Figure 4:
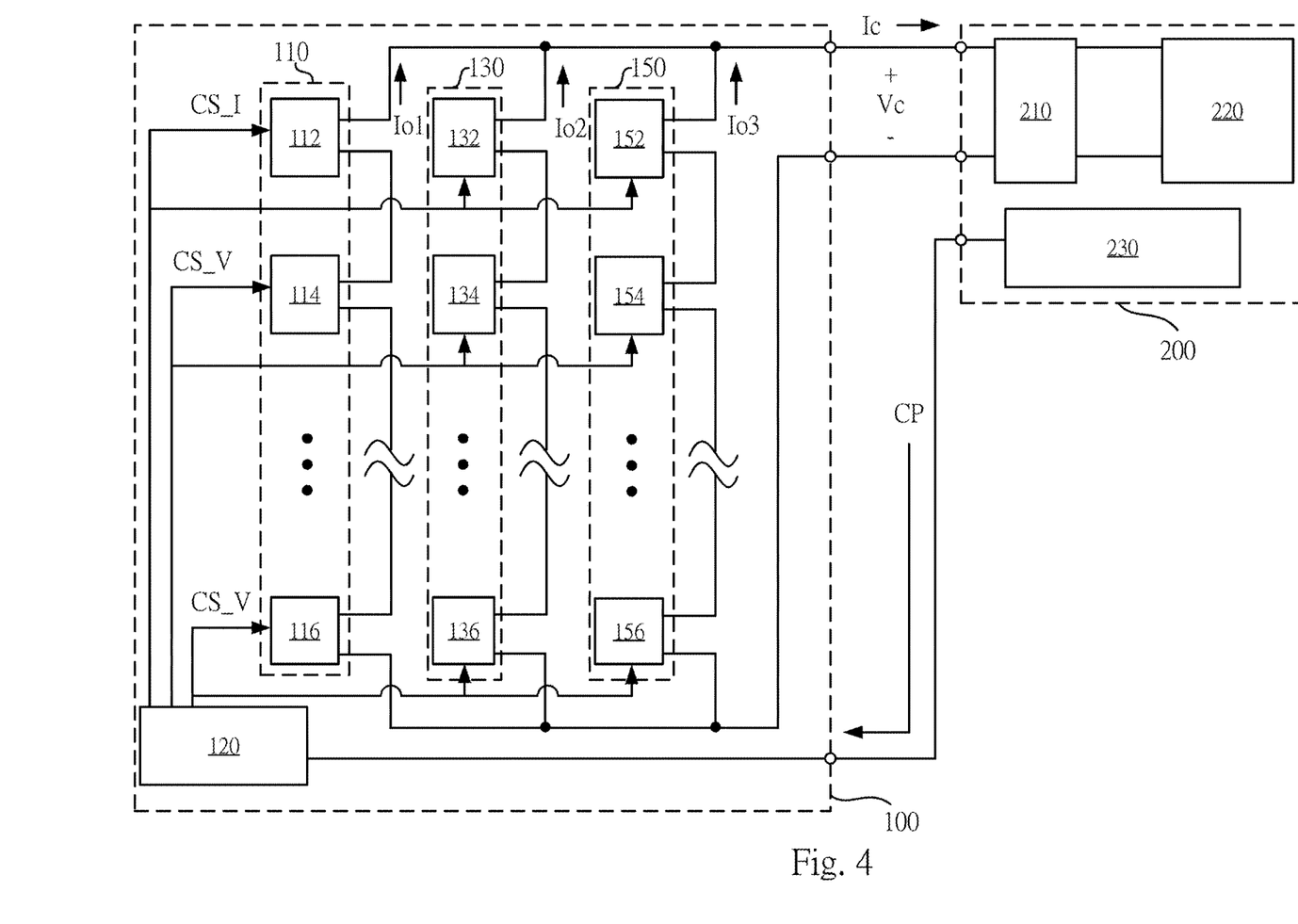
FIG. 4 is a diagram illustrating the operation of the electric vehicle supply equipment (EVSE) according to some embodiments of the present disclosure.

Reference is made to FIG. 4. FIG. 4 is a diagram illustrating the operation of the electric vehicle supply equipment (EVSE) 100 according to some embodiments of the present disclosure. With respect to the embodiments of FIG. 4, like elements in FIG. 1 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 4.

As depicted in FIG. 4, in some embodiments, the electric vehicle supply equipment (EVSE) 100 may include two or more charging circuits 110, 130, and 150. As depicted in the drawing, in some embodiments, the charging circuits 110, 130, and 150 are electrically coupled to each other in parallel at the output. The charging circuit 110 includes power modules 112, 114, 116 coupled to each other in series at the output. Similarly, the charging circuit 130 includes power modules 132, 134, 136 coupled to each other in series at the output. The charging circuit 150 includes power modules 152, 154, 156 coupled to each other in series at the output.

Similar to the operations of the power modules 112, 114, 116 in the charging circuit 110, the power modules 132-136, 152-156 in the charging circuit 130, 150 may also be configured to provide the charging current Ic and the charging voltage Vc in order to charge the electric vehicle 200. In some embodiments, the control circuit 120 is further configured to respectively output the corresponding current control signal CS_I to control one of the power module (e.g., power module 132) in the charging circuit 130 to be operated in the constant current mode, and output the corresponding voltage control signal CS_V to control other power modules (e.g., power modules 134, 136) in the charging circuit 130 to be operated in the constant voltage mode.

Similarly, the control circuit 120 also respectively outputs the corresponding current control signal CS_I to control one of the power module (e.g., power module 152) in the charging circuit 150 to be operated in the constant current mode, and output the corresponding voltage control signal CS_V to control other power modules (e.g., power modules 154, 156) in the charging circuit 150 to be operated in the constant voltage mode.

Thus, the control circuit 120 may control the output current Io1 of the charging circuit 110 by the power module 112 operated in the constant current mode, control the output current Io2 of the charging circuit 130 by the power module 132 operated in the constant current mode, and control the output current Io3 of the charging circuit 150 by the power module 152 operated in the constant current mode. Accordingly, the control circuit 120 may control the total charging current Ic (i.e., the sum of output current Io1-Io3) output by the electric vehicle supply equipment 100, and control the power modules 114, 116 operated in the constant voltage mode in the charging circuit 110 have the output voltage corresponding to their voltage control signals CS_V, the power modules 134, 136 operated in the constant voltage mode in the charging circuit 130 have the output voltage corresponding to their voltage control signals CS_V, and the power modules 154, 156 operated in the constant voltage mode in the charging circuit 150 have the output voltage corresponding to their voltage control signals CS_V, As mentioned in the above paragraphs, in some embodiments, the control circuit 120 may also output different voltage control signals CS_V to each power modules 114, 116, 134, 136, 154, 156 operated in the constant voltage mode in order to respectively control the corresponding output voltage at different voltage levels.

In addition, though only three charging circuits 110, 130, 150 coupled in parallel at the output are depicted in FIG. 4, the amount is merely by example for the convenience of explanation and not meant to limit the present disclosure. In some embodiments, the electric vehicle supply equipment 100 may include two charging circuits coupled in parallel, or over three charging circuits coupled in parallel to meet the actual requirements of the electric vehicle supply equipment 100.

Figure 5:
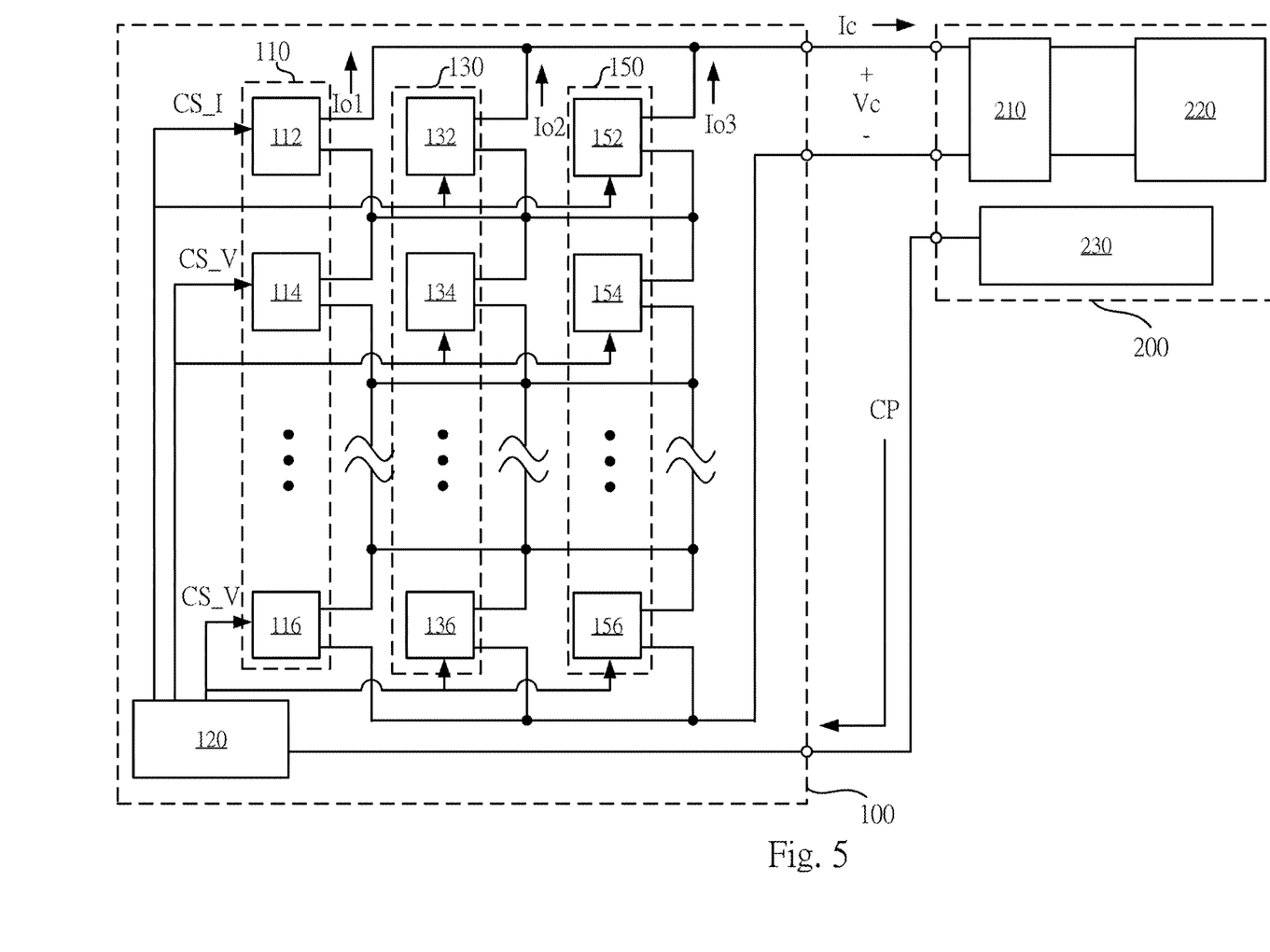
FIG. 5 is a diagram illustrating the operation of the electric vehicle supply equipment (EVSE) according to some embodiments of the present disclosure.

Reference is made to FIG. 5. FIG. 5 is a diagram illustrating the operation of the electric vehicle supply equipment (EVSE) 100 according to some embodiments of the present disclosure. As depicted in FIG. 5, in some embodiments, each of the power modules 112-116 may be electrically coupled in parallel to a corresponding one of the power modules 132-136 and 152-156 in the charging circuits 130 and 150.

Accordingly, the stability of the power output of each power modules 112-116, 132-136, 152-156 may further be guaranteed by coupling the adjacent power modules 112-116, 132-163, 152-156 in the charging circuits 110, 130, 150 in parallel.

Figure 6:
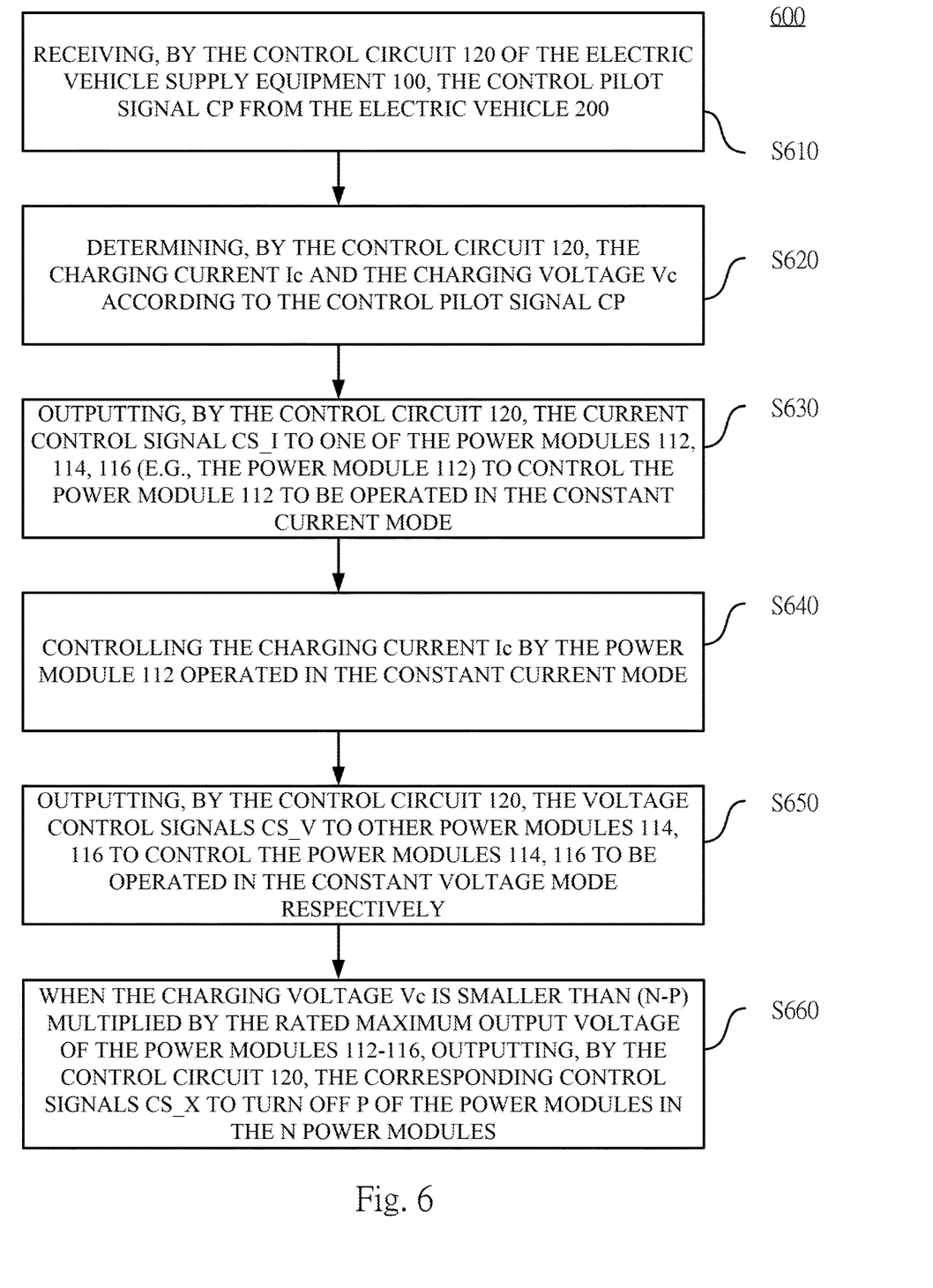
FIG. 6 is a flow chart illustrating a charging method according to some embodiments of the present disclosure.

Reference is made to FIG. 6. FIG. 6 is a flow chart illustrating a charging method 600 according to some embodiments of the present disclosure. For better understanding of the present disclosure, the charging method 600 is discussed in relation to the embodiment shown in FIG. 1-FIG. 5, but is not limited thereto. As shown in FIG. 6, the charging method 600 includes steps S610, S620, S630, S640, and S650.

First, in the step S610, receiving, by the control circuit 120 of the electric vehicle supply equipment 100, the control pilot signal CP from the electric vehicle 200.

Next, in the step S620, determining, by the control circuit 120, the charging current Ic and the charging voltage Vc according to the control pilot signal CP.

Next, in the step S630, outputting, by the control circuit 120, the current control signal CS_I to one of the power modules 112, 114, 116 (e.g., the power module 112) to control the power module 112 to be operated in the constant current mode.

Next, in the step S640, controlling the charging current IC by the power module 112 operated in the constant current mode.

Next, in the step S650, outputting, by the control circuit 120, the voltage control signals CS_V to other power modules 114, 116 to control the power modules 114, 116 to be operated in the constant voltage mode respectively. Specifically, the power modules 114, 116 operated in the constant voltage mode have the output voltage Vo2, Vo3 corresponding to their voltage control signals CS_V respectively.

In addition, in some embodiments, the charging method 600 further includes the step S660. In the step S660, when the charging voltage Vc is smaller than (N−P) multiplied by the rated maximum output voltage of the power modules 112-116, outputting, by the control circuit 120, the corresponding control signals CS_X to turn off P of the power modules in the N power modules, in which N is an integer larger than or equal to 2, and P is an integer smaller than N.

In addition, in some embodiments, the charging method 600 may also be applied in the electric vehicle supply equipment 100 including two or more charging circuit 110, 130. At the time, the step S630 in the charging method 600 further includes outputting, by the control circuit 120, the current control signal CS_I to one of the power modules 132, 134, 136 (e.g., the power module 132) to control the power module 132 to be operated in the constant current mode. The step S640 further includes controlling the charging current Ic by the power module 112 and the power module 132 operated in the constant current mode. The step S650 further includes outputting, by the control circuit 120, the voltage control signals CS_V to the other power modules 134, 136 to control the other power modules 134, 136 to be operated in the constant voltage mode respectively. Specifically, the power modules 114, 116 and the power modules 134, 136 operated in the constant voltage mode have the output voltages corresponding to their first or second voltage control signals CS_V respectively.

In summary, in the present disclosure, by applying the embodiments mentioned above, by operating one of the power modules in each of the charging circuits in the constant current mode as the constant current output power module, and operating other power modules in the charging circuits in the constant voltage mode as the constant voltage output power module, the electric vehicle supply equipment may provide higher charging voltage to charge the electric vehicle so as to meet the charging requirements of various electric vehicles using multiple power modules with lower rated maximum output voltage which are coupled in series at the output, such that a single power module may satisfy applications of various charging voltage.

What is claimed is:

1. An electric vehicle supply equipment, comprising:
   a plurality of first power modules electrically coupled to each other in series at output, and configured to provide a charging current and a charging voltage to charge an electric vehicle; and
   a control circuit configured to control one of the first power modules to be operated in a constant current mode to output the charging current, and configured to control the rest of the first power modules to be operated in a constant voltage mode to have at least one output voltage for generation of the charging voltage.

2. The electric vehicle supply equipment of claim 1, wherein the control circuit is further configured to output a first current control signal to control the one of the first power modules to be operated in the constant current mode, and configured to output at least one first voltage control signal to control the rest of the first power modules to be operated in the constant voltage mode.

3. The electric vehicle supply equipment of claim 2, wherein the control circuit is further configured to determine the charging current output from the electric vehicle supply equipment to the electric vehicle according to a control pilot signal output by the electric vehicle, so as to output the first current control signal to the first power module operated in the constant current mode.

4. The electric vehicle supply equipment of claim 2, wherein the control circuit is further configured to output the at least one first voltage control signal to the rest of the first power modules operated in the constant voltage mode according to a control pilot signal output by the electric vehicle, so as to control the at least one output voltage.

5. The electric vehicle supply equipment of claim 4, wherein the electric vehicle supply equipment comprises N first power modules, and when the charging voltage is smaller than (N−P) multiplied by a rated maximum output voltage of the first power modules, the control circuit is configured to output the at least one first voltage control signal to turn off P of the N first power modules, wherein N is an integer larger than or equal to 2, and P is an integer smaller than N.

6. The electric vehicle supply equipment of claim 2, further comprising:
   a plurality of second power modules electrically coupled to each other in series at output, and configured to provide the charging current and the charging voltage to charge the electric vehicle;
   wherein the control circuit is further configured to output a second current control signal to control one of the second power modules to be operated in the constant current mode, and configured to output at least one second voltage control signal to control the rest of the second power modules to be operated in the constant voltage mode.

7. The electric vehicle supply equipment of claim 6, wherein the control circuit is further configured to control the charging current via the first power module and the second power module operated in the constant current mode, and configured to control the rest of the first power modules and the rest of the second power modules operated in the constant voltage mode to have the at least one output voltage corresponding to the at least one first voltage control signal or the at least one second voltage control signal.

8. The electric vehicle supply equipment of claim 6, wherein each of the first power modules is electrically coupled in parallel to a corresponding one of the second power modules.

9. An electric vehicle supply equipment, comprising:
   a first charging circuit, comprising a first constant current output power module and at least one first constant voltage output power module, the first constant current output power module and the at least one first constant voltage output power module are electrically coupled in series to each other; and
   a control circuit, configured to control the first constant current output power module to output a charging current, and configured to control the at least one first constant voltage output power module to have at least one output voltage for generation of a charging voltage such that the first charging circuit supply power to an electric vehicle.

10. The electric vehicle supply equipment of claim 9, wherein the control circuit is further configured to output a first current control signal according to a control pilot signal output by the electric vehicle to control the first constant current output power module, and configured to output at least one first voltage control signal according to the control pilot signal output by the electric vehicle to control the at least one first constant voltage output module.

11. The electric vehicle supply equipment of claim 9, further comprising:
- a second charging circuit, comprising a second constant current output power module and at least one second constant voltage output power module, wherein the second charging circuit is electrically coupled in parallel to the first charging circuit at output;
- wherein the control circuit is further configured to output a second current control signal to the second constant current output power module according to a control pilot signal output by the electric vehicle so as to control a second output current of the second charging circuit, and configured to output at least one second voltage control signal to the at least one second constant voltage output module according to the control pilot signal output by the electric vehicle so as to control a second output voltage of the at least one second constant voltage output power module.

12. A charging method, comprising:
- controlling, by a control circuit, one of a plurality of first power modules to be operated in a constant current mode;
- outputting, by the first power module operated in the constant current mode, a charging current to an electric vehicle;
- controlling, by the control circuit, the rest of the first power modules to be operated in a constant voltage mode; and
- generating, by the rest of the first power modules operated in the constant voltage mode, a charging voltage to the electric vehicle, wherein the rest of the first power modules operated in the constant voltage mode have at least one output voltage for generation of the charging voltage.

13. The charging method of claim 12, further comprising:
- receiving, by the control circuit, a control pilot signal from the electric vehicle;
- determining, by the control circuit, the charging current and the charging voltage according to the control pilot signal;
- outputting, by the control circuit, a first current control signal to the one of the first power modules to control the one of the first power modules to be operated in the constant current mode;
- outputting, by the control circuit, at least one first voltage control signal to the rest of the first power modules to control the rest of the first power modules to be operated in the constant voltage mode, wherein the rest of the first power modules operated in the constant voltage mode have the at least one output voltage corresponding to the at least one first voltage control signal.

14. The charging method of claim 12, further comprising:
- when the charging voltage is smaller than (N−P) multiplied by a rated maximum output voltage of the first power modules, outputting, by the control circuit, the at least one first voltage control signal to turn off P of the first power modules, wherein N is an integer larger than or equal to 2, and P is an integer smaller than N.

15. The charging method of claim 12, further comprising:
- outputting, by the control circuit, a second current control signal to one of a plurality of second power modules to control one of the second power modules to be operated in the constant current mode;
- controlling the charging current by the first power module and the second power module operated in the constant current mode; and
- outputting, by the control circuit, at least one second voltage control signal to the rest of the second power modules to control the rest of the second power modules to be operated in the constant voltage mode respectively, wherein the first power modules and the second power modules operated in the constant voltage mode have the at least one output voltage corresponding to the at least one first voltage control signal or the at least one second voltage control signal.

* * * * *